(12) United States Patent
Morrison et al.

(10) Patent No.: US 8,339,315 B2
(45) Date of Patent: Dec. 25, 2012

(54) POSITIONING SYSTEM

(75) Inventors: Russell Gavin Morrison, Portsmouth (GB); Alasdair Ward Helliwell, Portsmouth (GB); David Charles Lancashire, Portsmouth (GB); Charles Stephen Dixon, Portsmouth (GB)

(73) Assignee: Astrium Limited, Hertfordshire (GB)

( * ) Notice: Subject to any disclaimer, the term of this patent is extended or adjusted under 35 U.S.C. 154(b) by 203 days.

(21) Appl. No.: 12/646,444

(22) Filed: Dec. 23, 2009

(65) Prior Publication Data
US 2011/0074628 A1 Mar. 31, 2011

(30) Foreign Application Priority Data
Sep. 30, 2009 (EP) .................................... 09275088

(51) Int. Cl.
*G01S 1/08* (2006.01)
(52) U.S. Cl. ........................................................ 342/386
(58) Field of Classification Search ........................ None
See application file for complete search history.

(56) References Cited

U.S. PATENT DOCUMENTS

| | | | |
|---|---|---|---|
| 5,621,646 A | 4/1997 | Enge et al. | |
| 5,666,366 A | 9/1997 | Malek et al. | |
| 5,686,924 A | 11/1997 | Trimble et al. | |
| 5,786,773 A * | 7/1998 | Murphy | 340/947 |
| 6,101,178 A | 8/2000 | Beal | |
| 6,198,432 B1 | 3/2001 | Janky | |
| 6,317,422 B1 * | 11/2001 | Khaleghi et al. | 370/342 |
| 6,813,500 B1 * | 11/2004 | Ciganer et al. | 455/456.1 |
| 2006/0050625 A1 | 3/2006 | Krasner | |
| 2008/0129591 A1 | 6/2008 | Lamance et al. | |
| 2008/0238765 A1 | 10/2008 | Zhang et al. | |
| 2008/0284647 A1 | 11/2008 | Oren et al. | |
| 2010/0068989 A1 * | 3/2010 | Lee et al. | 455/3.02 |

FOREIGN PATENT DOCUMENTS

| | | |
|---|---|---|
| EP | 1 953 561 | 8/2008 |
| FR | 2 803 665 | 7/2001 |
| WO | WO 2008/097651 | 8/2008 |

OTHER PUBLICATIONS

Abt et al., "Optimal Pulsing Schemes for Galileo Pseudolite Signals" Journal of Global Positioning Systems, 2007, vol. 6, No. 2, pp. 133-141.
Abt et al., "Optimal Pulsing Schemes for Galileo Pseudolite Signals" ION GNSS 18th International Technical Meeting of the Satellite Division, Sep. 13-16, 2005, Long Beach, CA, pp. 926-934.
Christiansen et al., "Introduction of Galileo in Maritime and Inland Waterway Applications" ENC GNSS'07/TimeNav'07, May 29-31, 2007, Geneva, Switzerland, 10 pages.

(Continued)

*Primary Examiner* — Harry Liu
(74) *Attorney, Agent, or Firm* — Buchanan Ingersoll & Rooney PC

(57) ABSTRACT

A positioning system (1) comprising one or more transmitters configured to transmit transmissions including positioning data, wherein the system is configured to synchronize the transmission with a reference time. The transmissions are formed using a repeating pseudorandom number (PRN) code comprising a plurality of chips. The system (1) is configured to determine a timing bias (44;54) between the first transmission and the reference time. The system (1) is configured to change the number of chips in one or more of said transmissions such that the timing bias of a subsequent pseudorandom number (PRN) code is reduced.

15 Claims, 3 Drawing Sheets

OTHER PUBLICATIONS

Cobb, "GPS Pseudolites: Theory, Design, and Applications" SUDAAR 707, Sep. 1997, 166 pages.

Cohen et al., "Precision Landing of Aircraft Using Integrity Beacons" Chapter 15, 1995, pp. 427-459, Published by the American Institute of Aeronautics and Astronautics, Inc.

Dixon et al., "Testbed for Galileo Maritime Demonstration" ENC GNSS 2006 Conference, May 7-10, 2006, 15 pages, Manchester, United kingdom.

Dixon et al., "Demonstration of a Galileo Based Maritime Navigation System" RIN NAV'07 Conference, London Oct. 30-Nov. 1, 2007, 11 pages.

Dixon et al., "GNSS Local Augmentation Integrity Standards—Future Communications Links to Users" ION GNSS 2004, Sep. 21-24, 2004, 10 pages, Long Beach, CA.

Dixon et al., "Local Integrity for Galileo" European Journal of Navigation, May 2005, vol. 3 No. 2, 15 pages.

Dixon et al., "Demonstration of a Galileo Based Maritime Navigation System—First Demonstration Results" ENC 08, Toulouse, 2008, 10 pages.

Dixon et al., "Maritime Demonstration Testbed for Galileo" ION GNSS 2006 Conference, Sep. 26-29, 2006, 8 pages, Fort Worth TX, USA.

Dixon et al., "A Pseudolite-Based Maritime Navigation System: Concept through to Demonstration" Journal of Global Positioning Systems, 2008, vol. 7, No. 1, pp. 9-17.

Elrod et al., "Pseudolites" Chapter 2, 1995, pp. 51-79, Published by the American Institute of Aeronautics and Astronautics, Inc.

Grant et al., "MARUSE Demonstrating the Use of Maritime Galileo Pseudolites" ION GNSS 20th International Technical Meeting of the Satellite Division, Sep. 25-28, 2007, pp. 1923-1930, Fort Worth, TX, USA.

Galileo Open Service Signal in Space Interface Control Document (OS SIS ICD), GAL OS SIS ICD/D.0 Issued 2006 Draft 0, European Space Agency/Galileo Joint Undertaking, 192 pages.

Morrison et al., U.S. Appl. No. 12/646,341, entitled "Positioning System", filed Dec. 23, 2009.

European Search Report issued in the corresponding Application No. 09275089.2-1248 dated Apr. 9, 2010.

European Search Report issued in the corresponding European Application No. 09275088.4-1248 dated Jun. 9, 2010.

* cited by examiner

POSITIONING SYSTEM

The present invention relates to a synchronised positioning or navigation system. In particular, the invention relates to a synchronised network of pseudolites used for determining position.

Satellite based positioning systems, in particular the Global Positioning System (GPS), provide a well known means for determining the position of a receiver. Signals from the satellites may be blocked by the receiver's surroundings, for example, by tall buildings. Degradation may occur due to reflections of the satellite signal or multipath propagation.

It is known to use pseudo-satellites, or pseudolites, in addition to satellites, for example as described in U.S. Pat. No. 5,686,924. Pseudolites are typically at fixed positions on the ground or on fixed structures, and mimic satellite navigation transmissions. Such pseudolites can improve positioning of a receiver in a local area.

Pseudolites can be located such that their signals are always received, and the locations can be accurately surveyed to minimise errors in the position solution at the receiver. Doppler issues that may exist in satellite sourced signals are minimised, and as a terrestrial based transmitter the pseudolite signal are not affected by ionospheric conditions.

Pseudolites each have an internal clock, which must be synchronised with other pseudolites in a system or with a satellite clock. A signal transmitted by a pseudolite contains clock data, which is used by the receiver to calculate position. Therefore, a timing error in the clock can translate into a positioning error.

The present invention provides, in a first aspect, a positioning system comprising a transmitter configured to transmit a transmission including positioning data, wherein the system is configured to synchronise the transmission with a reference time, and wherein the transmission is formed using a repeating pseudorandom number (PRN) code comprising a plurality of chips, and the system is configured to determine a timing bias between the transmission and the reference time, wherein the system is configured to change the number of chips in said transmission such that the timing bias of a subsequent pseudorandom number (PRN) code is reduced.

Thus, a transmission can be approximately synchronised with a external reference time.

Preferably, the transmission comprises a plurality of super frames formed using the repeating pseudorandom number (PRN) code, and the change in the number of chips occurs at the end of a super frame such that the timing bias of a subsequent super frame is reduced.

The present invention provides, in a second aspect, a positioning system comprising a transmitter configured to transmit one or more clock terms of a first clock relative to a reference time, wherein the clock terms include a drift term specifying rate of change of a timing bias between said first clock and said reference time; wherein said drift term is calculated from a recently determined drift and a previous value of the drift term; wherein the system is configured to transmit a modified drift term applicable for a time following a frequency change of the first clock, said modified drift term including an adjustment term based on the predicted frequency change.

Thus, accuracy of the drift term following a frequency change is improved.

Preferably, the previous value of the drift term, in the modified drift term, is replaced by a predicted value of the drift term and said adjustment term based on the predicted frequency change.

Preferably, the drift term is calculated using $$B_{n1}(t) = (1-\beta)B_{n1}(t-\Delta t) + \beta[(\delta_{n0}(t) - \delta_{n0}(t-\Delta t))/\Delta t]$$

wherein $\beta$ is a constant between 0 and 1, and $B_{n1}(t)$ is an estimate of the drift at time t, and $\delta_{n0}(t)$ is a measurement of the offset of the first clock at time t, said measurements taken at an interval $\Delta t$.

Preferably, following a frequency change of the first clock, the term $B_{n1}(t-\Delta t)$ is replaced by $$b_{n1} + \frac{\Delta f_{PSL}^{actual}(t_{oc})}{f_{system}(t_{oc})}$$

wherein $b_{n1}$ is the predicted drift term at the time of the frequency change, and $$\frac{\Delta f_{PSL}^{actual}(t_{oc})}{f_{system}(t_{oc})}$$

is the actual frequency change of the first clock divided by the frequency of the reference time, at the time of the frequency change.

Preferably, the transmission comprises a plurality of super frames, and the change in the frequency occurs at the end of a super frame.

The present invention further provides a method of providing positioning data comprising transmitting one or more clock terms of a first clock relative to a reference time, wherein the clock terms include a drift term specifying rate of change of a timing bias between said first clock and said reference time; wherein said drift term is calculated from a recently determined drift and a previous value of the drift term; and transmitting a modified drift term applicable for a time following a frequency change of the first clock, said modified drift term including an adjustment term based on the predicted frequency change.

The present invention provides, in a third aspect, a positioning system comprising a transmitter configured to transmit a transmission comprising one or more clock terms of a first clock relative to a reference time, wherein the clock terms include one or more timing properties defined between said first clock and said reference time; wherein the system is configured to change the frequency of the first clock, wherein the system is configured to calculate and transmit clock terms prior to the frequency change, said clock terms relating to a time after the frequency change.

Thus, a receiver can immediately use an accurate timing offset value, improving accuracy of the determined position of the receiver.

The present invention will now be described, by way of example only, with reference to the accompanying drawings, in which.

Figure 1:
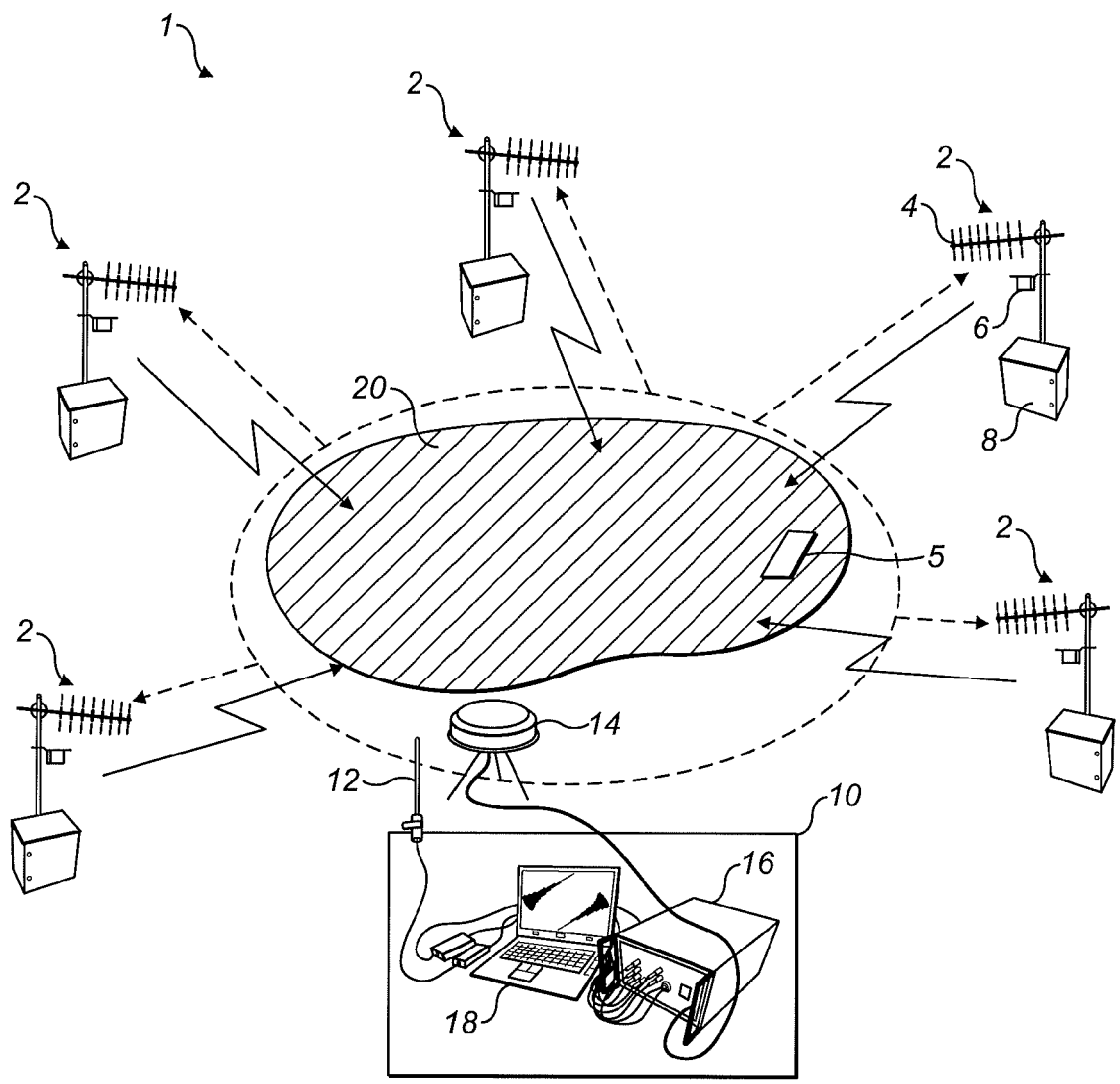
FIG. 1 is a schematic overview of the system according to the present invention.

FIG. 1 shows a pseudolite system 1 according to the present invention. The pseudolite system 1 comprises at least one pseudolite 2, and preferably more than one remotely located pseudolites 2. The system preferably includes between two and ten pseudolites, and FIG. 1 shows five pseudolites as an example only. The pseudolites 2 are arranged to transmit positioning signals to a user receiver 5 in a defined area 20. The area 20 may be several kilometres in extent. The area 20 may include a harbour, port, airport, railway, road or any area where reliability and/or accuracy of positioning of a user receiver 5 is to be increased. In particular, the pseudolite system 1 may be used in a critical situation area where safety of life and/or continuity of high-quality system performance are required. The pseudolite system 1 may also be used in a difficult environment, including situations where Global Navigation Satellite System (GNSS) signals may become blocked by local obstructions, including urban canyons and indoor operations among other environments. The pseudolites are mounted on existing structures or the ground in or around the area 20.

The system 1 further includes a monitoring and control station 10. A communications link exists between the monitoring and control station 10 and each pseudolite 2, which allows for data to be exchanged between the monitoring and control station 10 and each pseudolite 2. The monitoring and control station 10 may be ground-based at a location remote from the pseudolites 2, or may be co-located with a pseudolite 2.

The pseudolites 2 are transmit stations each having a transmitter 6 configured to transmit positioning signals, including positioning data, resembling positioning signals transmitted by a satellite positioning system. The position of each pseudolite antenna 6 is accurately surveyed, preferably in the GPS coordinate system, and is transmitted to the user receiver 5. In particular, the pseudolites 2 transmit signals corresponding to the structure used by the Galileo satellite system. Preferably, the transmission signal uses the Galileo E5 Alt-BOC signal structure. The positioning signals may be transmitted continuously or in pulses. The pseudolites preferably each transmit in pulses in separate time slots. The code length for a complete primary code is 1 ms. Each pulse timing slot is 1 ms/11, i.e. $\frac{1}{11}$ of a code repeat. In addition, the pseudolites 2 each have an aerial 4 for receiving data from the monitoring and control station 10 over the communications link.

Each pseudolite 2 has a processing unit 8, which includes a clock provided by a local oscillator. Each pseudolite in the system is remote and uses its own oscillator for timing reference. The clock preferably uses an ovenised crystal oscillator (OCXO). Such an oscillator has the advantage of being relatively inexpensive. However, a crystal oscillator is not as accurate as an atomic clock used in a satellite. For example, a Global Positioning System (GPS) uses a Rubidium and Caesium atomic clock, and the Galileo system uses a Hydrogen Maser and Rubidium atomic clock.

The monitoring and control station 10 includes a processing unit 18. The processing unit 18 is configured to generate synchronisation data for ensuring the pseudolites 2 are synchronised to each other and/or to an external reference. The monitoring and control station 10 includes an antenna 12 connected to the processing unit 18, and configured to transmit configuration data to, and receive data from, the pseudolites 2. The monitoring and control station 10 and pseudolites 2 are preferably connected by a wireless local area network (WLAN). Alternatively, the monitoring and control station 10 and pseudolites 2 may be connected by a wired network, or any suitable communications link. The monitoring and control station 10 includes an antenna 14 and a reference receiver 16 arranged to receive transmissions broadcast by the pseudolites.

The monitoring and control station 10 generates navigation messages to be transmitted by the pseudolites 2, emulating the function of a central control facility in a satellite positioning system. The navigation messages are transmitted to each pseudolite 2 over the WLAN. The monitoring and control station 10 is preferably remote from the pseudolites 2.

The monitoring and control station 10 monitors the positioning signals transmitted by each pseudolite 2 via antenna 14 and reference receiver 16. The monitoring and control station 10 compares the clock bias (timing offset), clock drift (rate of change of offset) and acceleration (rate of change of drift) of each pseudolite with a master clock. The monitoring and control station 10 calculates timing correction information (bias, drift and acceleration) for each pseudolite 2, and transmits the timing correction information to each pseudolite 2.

The master clock is preferably the clock in one of the pseudolites, referred to as the master pseudolite. The clocks of all other pseudolites in the system 1 have corrections calculated relative to the master clock, and are referred to as slave clocks. The pseudolites other than the master pseudolite, and having a slave clock, are referred to as slave pseudolites. The master pseudolite preferably has no physical difference to the slave pseudolites, and so the choice of which pseudolite is the master pseudolite is an arbitrary selection on start-up. The monitoring and control station 10 does not have a clock which is directly used for timing information. The instantaneous offset of a slave pseudolite time compared to the master pseudolite is determined be comparing pseudorange measurements of the slave pseudolite 2 to the known position of the slave pseudolite 2. This information is filtered and used to derive the timing correction information which is uploaded to each pseudolite and transmitted in the navigation message by each pseudolite 2.

In one embodiment, the slave clocks are approximately synchronised with the master clock, and/or timing correction information is transmitted to each slave pseudolite. The master clock is not synchronised with any external reference, in particular, the master clock is not synchronised with an external reference from a satellite positioning signal. The master clock will typically deviate from the more accurate external reference over time. A user receiver 5 in area 20 can still obtain an accurate and reliable position from the pseudolite system only, since the relative timings of the pseudolite clocks are well defined within the system 1. A minimum of five signal measurements are required to obtain a user navigation solution with unsynchronised system times.

In a preferred embodiment, the monitoring and control station 10 includes an antenna 14 and a reference receiver 16 arranged to receive signals from an external reference, in particular, a satellite. The reference receiver 16 processes the signals, and passes the processed signals to the processing unit 18. The satellite signals are preferably positioning signals, in particular from a global navigation satellite system (GNSS), e.g. a satellite operating in the Galileo positioning system. The monitoring and control station 10 uses the satellite signals as an external timing reference. The antenna 14 and reference receiver 16 also receive the positioning transmissions broadcast by the pseudolites 2.

In a preferred embodiment, timing information from the external timing reference is sent to the master pseudolite. The master clock is synchronised with the external timing reference, and/or an offset time relating to a difference between the master clock and external reference is transmitted with the timing signal. A user receiver 5 can use signals from one or both the pseudolites 2 and the satellite positioning system providing the external timing reference interchangeably. Timing corrections are transmitted by each pseudolite 2 in a timing message to indicate to the user receiver 5 the offset of the transmitting pseudolite time to a reference time based on Pseudolite System Time (from the master pseudolite clock) and/or based on an external reference time (e.g. from a satellite). A minimum of four signal measurements are required to obtain a user navigation solution with such synchronised system times.

The user receiver 5 is preferably not part of the pseudolite system 1, but is configured to operate with the system 1. Alternatively, the user receiver 5 may be considered part of the system 1.

The data being received from the reference receiver 16 will include measurements of Pseudorange, Carrier Phase, Doppler, C/No and lock time; data such as raw Navigation symbols and tracking & receiver status. The processing unit 18 provides the mechanism for generating commands for dissemination over the communications link to each pseudolite for passing of navigation parameters and miscellaneous data. Linked with the processing unit 18 is a mechanism for accepting and processing acknowledgements and other health & status data from each of the pseudolites received via the communications link. A user interface is provided to enable inputting of parameters, obtaining system status general system housekeeping as well as functionality for storage of status data on appropriate media. The monitoring and control station processing unit 18 also provides the low-level algorithms for timing within the system 1. The processing unit 18 includes the algorithms for determining timing offsets to be sent to each pseudolite 2.

Figure 2:
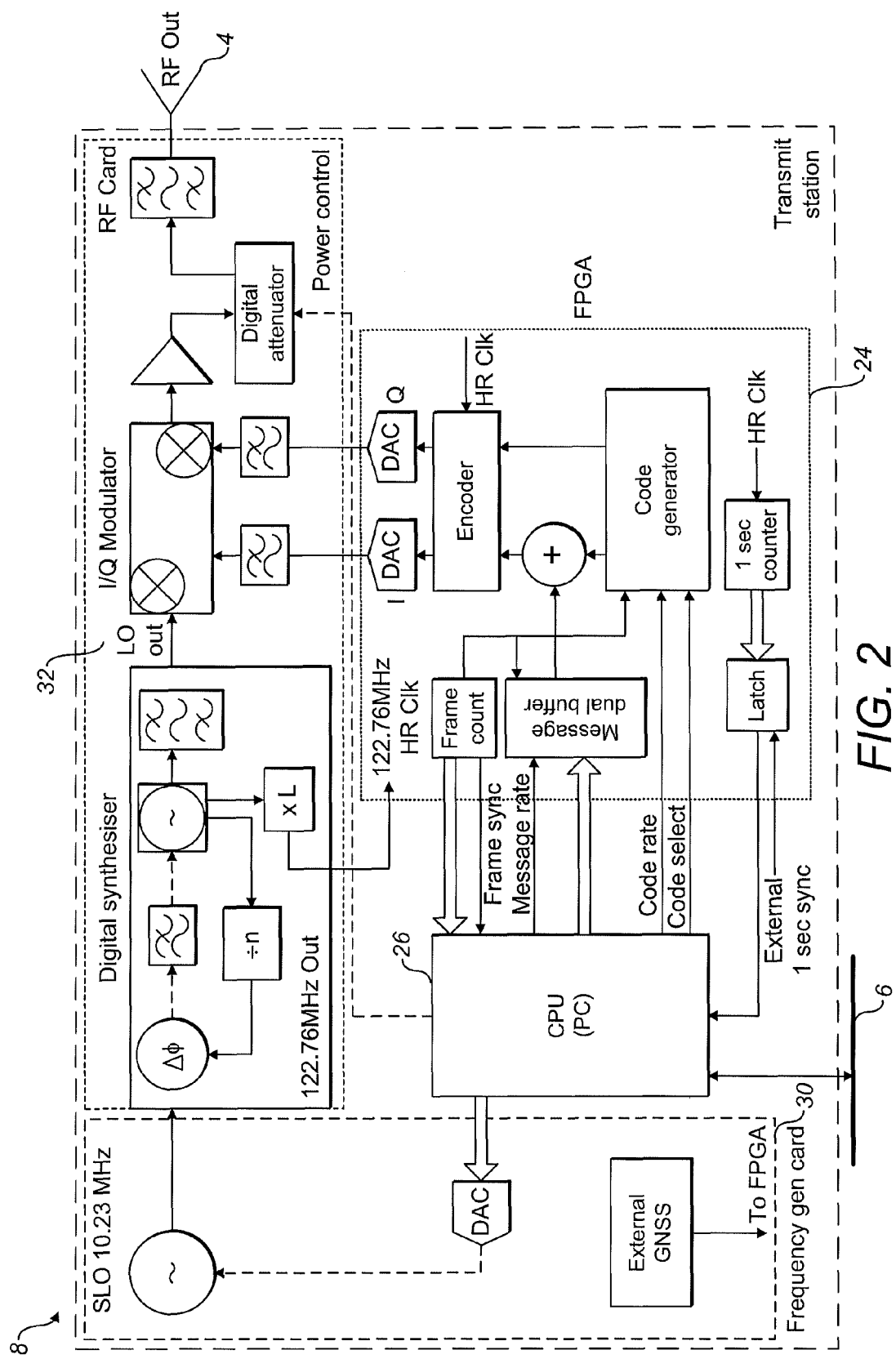
FIG. 2 is a schematic view of part of a pseudolite according to the present invention.

FIG. 2 shows a schematic view of the core of processing unit 8 of a pseudolite 2. The processing unit 8 comprises four distinct parts: a timing and frequency generation section 30, a radio frequency (RF) section 32, a real-time firmware section including an FPGA device 24 and control and a "soft real-time" software section 26 hosted on a central processing unit (CPU). It is considered construction of such a processing unit 8 would be possible for a person skilled in the art.

The pseudolite transmission is based on a single stage single sideband up-conversion process, which can consistently deliver high spectral performance. The single stage single sideband output is generated by means of a single chip complex up-converter. This device incorporates two single stage double sideband suppressed carrier mixers whose local oscillators are in phase quadrature. The baseband input signals, also in phase quadrature, are up-converted by these mixers. Their outputs are combined to produce either an upper or lower sideband signal depending on the lead/lag relationship between the baseband inputs. The remainder of the circuitry is concerned with the creation and control of these baseband signals which will maximize the up-conversion process.

The pseudolite transmissions in the system 1 are identical in terms of frequency and modulation to Galileo satellite transmissions. The transmissions comprise two pairs of In-phase and Quadrature (I&Q) components referred to as E5A and E5B, which are AltBOC modulated onto an RF carrier centred at 1191.795 MHz.

The transmissions are modulated onto a pseudo-random number (PRN) code, which is a pre-determined code unique to each pseudolite. The PRN codes comprise 10230 primary code chips.

The update rate for clock corrections in the system 1 is higher than for a typical GNSS system. In the present invention, clock corrections are preferably transmitted at a baseline rate of between once per 25 seconds and 100 seconds, and preferably once per 25 seconds or 50 seconds. A rate of once per 50 seconds provides alignment and synchronisation with the Galileo message frame structure on E5a and E5b carriers.

On start-up of the pseudolite system 1, a synchronisation process is undertaken to initiate and align each pseudolite time to Pseudolite System Time, defined by the Master pseudolite. Frequency and time adjustments are made to each pseudolite 2 to synchronise each pseudolite in the network. Once the system 1 becomes operational, the timing information determined by the timing algorithm indicates the small differences in time alignment between each pseudolite as the individual oscillators will not achieve or maintain perfect synchronisation.

Whilst each pseudolite is transmitting, timing algorithms run by the monitoring and control station 10 determine the time corrections (bias, drift and acceleration) of each slave pseudolite time from the master pseudolite time. The bias, drift and acceleration is relayed to each pseudolite 2 from the monitoring and control station 10 and broadcast by the pseudolite 2 in the navigation message. In addition, the offset from a satellite navigation system time is determined and sent to each pseudolite 2 for transmission to the user receiver 5 by the same means. The drift may be substantially removed by adjusting the frequency of the slave pseudolite oscillator.

The monitoring and control station 10 monitors the pseudolites 2, and evaluates the quality of the timing information transmitted. The monitoring and control station 10 has the capability to set a pseudolite to 'non operational' status should the pseudolite performance falls outside pre-determined parameters. An example of such an instance could occur if pseudolite signal reception is interrupted at the reference receiver 16, thus reducing the amount of data available to determine the timing information. The timing algorithm in the monitoring and control station 10 can deal with missed measurements but as the amount of data missed increases, the accuracy of the timing information will degrade and positioning accuracy will be affected.

In addition to monitoring integrity, the timing algorithm in the monitoring and control station 10 also provides the capability to adjust the Slave Pseudolite oscillator frequency whilst the system 1 is operational. Should a pseudolite time begin to drift beyond a defined tolerance, a frequency adjustment is determined and implemented at the pseudolite, in an analogous manner to the synchronisation process. To maintain positioning accuracy, the frequency adjustment is accommodated in the timing information transmitted by the pseudolite.

The user receiver 5 calculates a clock model based on the time the pseudolite transmission is received and the timing offset information in the transmission. The clock model applied at the user receiver 5 must be accurate to the true clock offset to within approximately 3 ns to maintain position uncertainty due to timing error, of the order of 1 metre. Over time, the modelled clock offset will diverge from the true clock offset and so clock terms (timing properties or corrections) in the transmitted navigation timing message must be updated frequently enough that the user receiver 5 will always know the pseudolite clock bias to sufficient accuracy. The clock term updating scheme is governed by the message structure of the Galileo signal and in this particular instance the timing message is contained within a super frame (encapsulation of a number of Navigation frames into a known hierarchy). A super frame has duration of 50 seconds on E5a and 25 seconds on E5b. Typically, the duration of a super frame is required before the user receiver 5 has fully received and can apply the broadcast clock terms from the navigation message.

Figure 3:
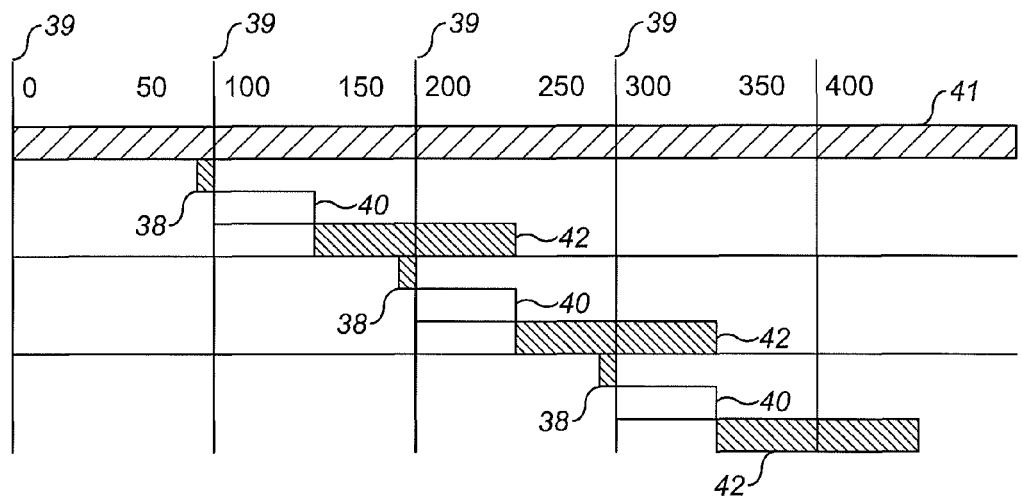
FIG. 3 is a schematic view of transmission timings used by a pseudolite according to the present invention.

FIG. 3 shows a timing update scheme for the system 1. The clock terms are determined by the monitoring and control station 10 and sent to the pseudolites 2 a period 38, also termed x, before a super frame boundary 39. Super frame boundaries 39 occur every 50 seconds for E5a, and only alternate boundaries 39 are shown. Preferably, x is approximately 5 seconds before transmission of the next super frame.

The timing information for each pseudolite is included in the navigation message sent by the pseudolite 2 to the user receiver 5. The pseudolite 2 is assumed to take a whole super frame to transmit the clock terms (one or more of bias, drift and acceleration). The clock terms are thus known at the user receiver 5 after length of a super frame 40, also termed $t_{sf}$ (50 seconds for E5a) after the start of transmission. For a user receiver 5 using the E5b frequency, the terms could be known after 25 seconds, since the E5b super frame is 25 seconds long. For simplicity, the schedule is shown based on the duration of an E5a super frame (50 seconds) only.

The clock terms are used by the user receiver 5 for a period 42, which is preferably two super frames in length (100 seconds). The clock terms are preferably updated at an update rate of once every two super frames, e.g. every 100 seconds for E5a. For an update frequency of once every 100 seconds, the clock terms must be valid for a period of the sum of periods 38, 40 and 42, which is approximately 155 seconds. This is the time between the derivation of the clock terms and their final use. The reference receiver 16 outputs data once per second and so at least 100 measurements of the instantaneous clock offset are used to determine the new clock terms. The measurements of the instantaneous clock offset are shown as occurring over a period 41. The period 41 starts prior to the determination of the clock terms, and continues at finely spaced discrete intervals throughout operation of the system 1.

The monitoring and control station 10 uses particular algorithms to generate the clock terms, and perform synchronisation functions. These algorithms will now be described in detail.

Exponential Correction Filter

The exponential correction filter is an algorithm executed by the Monitoring and Control station 10. The exponential correction filter provides an estimate of future time offsets (clock terms or timing properties) of the slave pseudolites 2 from system time, based on both a recent measurement based on the weighted sum of a recent absolute measurement and an estimator of the noise free time offset formed from a number of previous absolute measurements (history).

The exponential correction filter effectively filters out noise. The recent measurement provides information on the current time offset, but the recent measurement has the disadvantage that it is affected by noise. The history of the previous measurements is less affected by noise than the single recent measurement, but the history includes timing information which is older than the recent measurement. The exponential correction filter combines both a recent measurement and history to provide an accurate estimate of bias, drift and acceleration. The recent measurement is termed a "determined timing property", and may be one or more of the bias, timing drift or timing acceleration. The history value may be termed a "compensated timing property", and may relate to a previous calculation (or coefficient) of the combination of measurement and history for one or more of a compensated bias, timing drift or timing acceleration. The history is less affected by noise because the noise has been filtered by the filter. The previous measurements themselves would still contain noise.

The history is updated with a new absolute measurement at each measurement cycle. A weighting factor is used to determine the relative weight of the history compared to the recent measurement. This allows the measurement to measurement variations caused by noise to be smoothed out through the influence (averaging effect) of the history. The more weight put on the new measurement, the more the noise has influence. The more weight given to the history, the more noise is reduced. However, the ability of the exponential correction filter to track rapid changes in offset (i.e. a real change, not noise) is reduced as the history is relied on to a larger extent.

The exponential correction filter takes in measurements of the instantaneous clock offset, determined from the pseudo-range of the slave pseudolites 2. The exponential correction filter determines an estimate for the next noise free value, $B_{n0}$ for slave pseudolite number n relative to the master pseudolite. The 0 subscript indicates B is the time offset (bias) itself. This is essentially an estimate of the clock bias and is based to some degree on the history of the previous measurements. The same approach is used for determining drift $B_{n1}(t)$ (sometimes referred to as slope or rate) and acceleration $B_{n2}(t)$ of the time bias at time t. The $B_n$ terms provide an estimate of the current time bias, drift and acceleration with reduced noise, and which will be termed a compensated estimate or a previous value may be termed a "compensated timing property".

The acceleration prediction $B_{n2}(t)$ is given by:

$$B_{n2}(t) = (1-\gamma)B_{n2}(t-\Delta t) + \gamma[(\delta_{n0}(t) - 2\delta_{n0}(t-\Delta t) + \delta_{n0}(t-2\Delta t))/\Delta t^2] \quad \text{[Equation 1]}$$

where $\delta_{n0}(t)$ is the measurement at time t of instantaneous clock offset for slave pseudolite n to the master pseudolite (denoted 0). $\Delta t$ is the difference in time between each measurement (for example, $\delta_{n0}(t)$ is the current measurement and $\delta_{n0}(t-\Delta t)$ is the previous). $\Delta t$ will typically be 1 second. $\gamma$ is the weighting factor which is used to define how much the prediction of the acceleration relies on the actual measurement and the previous prediction. $(\delta_{n0}(t) - 2\delta_{n0}(t-\Delta t) + \delta_{n0}(t-2\Delta t))/\Delta t^2$ represents the unbiased current estimate of the clock acceleration and $B_{n2}(t-\Delta t)$ represent the 'history', or the previous value of the acceleration prediction.

The estimate of the drift, $B_{n1}(t)$, is given (by:

$$B_{n1}(t) = (1-\beta)B_{n1}(t-\Delta t) + \beta[\delta_{n0}(t) - \delta_{n0}(t-\Delta t)/\Delta t] \quad \text{[Equation 2]}$$

where $\beta$ is the weighting factor which is used to dictate how much the slope estimate relies on the measurements or the previous estimates. All other terms are as defined above. It is clear that if $\beta$ (or $\alpha$ or $\gamma$) is set to 0, the slope is determined simply from the last slope estimate, and if it is set to 1, the slope is determined solely from the measurements. Given that the measurements are noisy, an appropriate value of $\beta$ between 0 and 1 must be used to sufficiently filter out the noise. For example, $\beta$ may be set as 0.1. As a further example, $\beta$ may be set as 0.05, and typically, $\beta$ will be less than 0.2. Similar values may be used for $\alpha$ or $\gamma$. Typically, the values of $\alpha$, $\beta$ and $\gamma$ will be different, although may be the same.

The prediction at time t of the next noise free value of the time offset $B_{n0}$ is given by:

$$B_{n0}(t) = (1-\alpha)B_{n0}(t-\Delta t) + \alpha\delta_{n0}(t) \quad \text{[Equation 3]}$$

In this case, $\alpha$ is the weighting factor and must be chosen appropriately to filter out the noise.

By choosing appropriate values of $\gamma$, $\beta$ and $\alpha$ between 0 and 1, a predicted value of the noise free measurement of the time offset is made through a combination of the last three measurements and a weighted average of the previous predictions. Alternatively, $\gamma$, $\beta$ and $\alpha$ may be between 0 and a different maximum value. The value of $\gamma$, $\beta$ and $\alpha$ is subtracted from the chosen maximum number in the first term of the above equations, and the terms normalised using chosen maximum number.

Each prediction is based on previous predictions and hence the last three measurements are used to estimate the clock bias, drift and acceleration terms, given a polynomial fit to the data as represented by time offset $\Delta t_{PSL}$:

$$\Delta t_{PSL} = a_{f0} + a_{f1}(t-t_{oc}) + a_{f2}(t-t_{oc})^2 \quad \text{[Equation 4]}$$

The polynomial coefficients for slave pseudolite n are given by:

$$a_{f0}{}^n = B_{n0}(t) \quad \text{[Equation 5]}$$

$$a_{f1}{}^n = B_{n1}(t) \quad \text{[Equation 6]}$$

$$a_{f2}{}^n = B_{n2}(t) \quad \text{[Equation 7]}$$

It is important, particularly at the time of clock frequency change, that the clock terms above are applied by the user receiver 5 when required and not before. This can be forced to some extent by defining $t_{oc}$ as the start of the super frame (the encapsulation of navigation pages in to a stream of data) for which the terms should be used. As shown in FIG. 3, the clock terms may be applied one super frame later, i.e. 50 s after the start of the super frame in which the terms are first transmitted.

A new set of parameters $b_{n0}$, $b_{n1}$, and $b_{n2}$ may be defined which are the current filter predictions at time t adjusted to be valid at time $t_{oc}$. These are determined by noting that the acceleration filter is the second derivative of the offset and the drift filter is the first derivative. Therefore:

$$b_{n0} = B_{n0}(t) + B_{n1}(t)(t_{sf}+x) + B_{n2}(t)(t_{sf}+x)^2 \quad \text{[Equation 8]}$$

$$b_{n1} = B_{n1}(t) + 2B_{n2}(t)(t_{sf}+x) \quad \text{[Equation 9]}$$

$$b_{n2} = 2B_{n2}(t) \quad \text{[Equation 10]}$$

with $t_{oc} = t + t_{sf} + x$
where $t_{sf}$ is the length of a super frame (preferably 50 seconds for an E5a super frame) and x is time taken between the last prediction t and the start of the super frame in which the clock terms are used (for example, $t_{sf}+x$ would be approximately 55 seconds if the clock terms are determined 5 seconds before the super frame boundary (i.e. x=5)).

The clock terms are therefore given by $$a_{f0}{}^n = b_{n0} \quad \text{[Equation 11]}$$

$$a_{f1}{}^n = b_{n1} \quad \text{[Equation 12]}$$

$$a_{f2}{}^n = b_{n2} \quad \text{[Equation 13]}$$

The bias, drift and acceleration terms along with the time of applicability, $t_{oc}$ are sent to the Pseudolite for transmission in the navigation message. The user receiver 5 then applies:

$$\Delta t_{PSL} = a_{f0} + a_{f1}(t-t_{oc}) + a_{f2}(t-t_{oc})^2 \quad \text{[Equation 14]}$$

to determine the transmit clock bias when solving for position. The terms are determined from instantaneous measurements at the time of the reference receiver clock whereas for $\Delta t_{PSL} = a_{f0} + a_{f1}(t-t_{oc}) + a_{f2}(t-t_{oc})^2$ the coefficients should be expressed in terms of system time. The user receiver 5 is provided with clock corrections for application at a future time. The monitoring and control station 10 and pseudolites 2 transmit the timing offsets (bias, drift and acceleration) prior to future time $t_o$, In particular, the transmission to a pseudolite 2 by the monitoring and control station, and the transmission to the user receiver 5, may include a future compensated timing property (one or more of bias, drift and acceleration terms, $b_{n0}$, $b_{n1}$, $b_{n2}$) in a super frame. The future timing property or properties preferably relate to a subsequent super frame. Alternatively, the total timing offset $\Delta t_{PSL}$ may be transmitted by a pseudolite 2.

The frequency of a slave pseudolite clock oscillator may be changed at start-up or during operation, as described below. Following the change in frequency, the timing drift history and timing acceleration history calculated using the above method no longer accurately predicts future timing offsets. The bias history is generally not affected by the frequency change.

Calculation of the timing drift at a future time $t_{oc}$ following a frequency adjustment and using past measurements may result in a timing offset which 'overshoots' by not immediately responding to correction provided by the frequency change. Details of the modification of the clock terms following frequency adjustment, in particular the drift, are described below.

Frequency Adjustment

The clock of each pseudolite is based on an oscillator. It is preferred that the oscillators of the pseudolites 2 operate at a frequency which is as close as possible to each other. The frequency of each oscillator is preferably adjusted during the start-up procedure, and may also be adjusted during use.

The aim of the frequency adjustment during the start-up procedure is to adjust each slave pseudolite oscillator frequency to be as near as possible to that of the master pseudolite oscillator frequency. The frequency adjustment is carried out by adjusting the clock frequency until the clock drift is as small as possible, or within a pre-defined threshold.

At time t, the slave pseudolite frequency relative to the master pseudolite (system time) is given by:

$$f_{PSL}(t) = f_{system}(t) + B_{n1}(t)f_{system}(t) \quad \text{[Equation 15]}$$

where $f_{PSL}(t)$ is the frequency of the slave pseudolite oscillator at time t and $f_{system}(t)$ is the frequency of the master pseudolite oscillator (or system time) at time t. $B_{n1}(t)$ is the current drift prediction at time t. Nominally, frequency adjustments will be made on the next but one super frame boundary and so frequency adjustment should take this into account if the current drift is not constant. For example, the frequency of the pseudolite at the next but one super frame boundary ($t_{oc}$) is given by:

$$f_{PSL}(t_{oc}) = f_{system}(t_{oc})[1 + (B_{n1}(t) + 2B_{n2}(t)(t_{sf}+x))] \quad \text{[Equation 16]}$$

where $t_{oc} = t + t_{sf} + x$, where $t_{sf}$ is the length of a super frame (preferably 50 seconds for an E5a super frame) and x is time taken between the last prediction t and the start of the super frame in which the clock terms are used, which can be simplified to:

$$f_{PSL}(t_{oc}) = f_{system}(t_{oc})(1 + b_{n1}) \quad \text{[Equation 17]}$$

To adjust the pseudolite oscillator to be the same frequency as the master pseudolite frequency, the required adjustment, $\Delta f_{PSL}$, is determined using $$\Delta f_{PSL}{}^{required}(t_{oc}) = -b_{n1}f_{system}(t_{oc}) \quad \text{[Equation 18]}$$

where $b_{n1}$ is the drift parameter as calculated above.

The absolute frequency of system time, in particular the master Pseudolite oscillator, may not be known precisely. The approximation of $f_{system}$=pre-determined value, e.g. 10.23 MHz (exactly) is generally sufficient. Alternatively, $f_{system}$ may be approximated as the slave pseudolite frequency.

At start-up it is desirable to set the clock frequency of each pseudolite oscillator to as close to the master pseudolite clock as possible. Typically, it is not possible to match frequency exactly. Providing the slave pseudolites with a slight drift relative to system time may be desirable when operational, the intentional drift being in a direction opposite to the current bias offset. The clock frequency of a pseudolite oscillator is selected to reduce the magnitude of the offset relative to the master pseudolite clock. Thus, the bias offset will gradually decrease over time. For example, if the slave pseudolite has a positive bias, e.g. 1 μs ahead of the master pseudolite time, the slave pseudolite frequency may be adjusted to be slightly lower than the master pseudolite frequency. The difference between the slave pseudolite time and master pseudolite time will therefore decrease over time. If the frequency is 'over adjusted' then the pseudolite time will drift relative to system time. The method according to the present invention allows the slave pseudolite oscillator frequencies to be controlled within positive and negative limits with over adjustments being made when a control limit is reached, to controllably drift the time in the opposite sense.

The required frequency change is therefore given by $$f_{PSL}^{required}(t_{oc}) = -b_{n1}f_{system}(t_{oc}) + \Delta f_{PSL}^{extra} \quad \text{[Equation 19]}$$

where $\Delta f^{extra}$ is the extra frequency adjustment used to drift pseudolite time ($\Delta f^{extra}$ may be zero at start-up when initially trying to synchronise a slave pseudolite to system time). $\Delta f^{extra}$ can be used to drift the pseudolite clock time between control limits by setting this in the opposite sense to the current bias. For example, the extra frequency adjustment should be negative if the current bias is positive and should be positive if the current bias is negative. In this way, the clock time will drift relative to system time and large biases will be reduced accordingly. In particular:

$$\text{sign}(\Delta f_{PSL}^{extra}) = -(\text{sign}(b_{n0})) \quad \text{[Equation 20]}$$

The clock frequency change is made by adjusting the Digital to Analogue Converter (DAC), which determines the reference value controlling the voltage controlled oscillator. The DAC is adjusted by an adequate amount relating to the required frequency adjustment. Due to quantisation of the DAC output, the exact frequency adjustment may not be possible and so the frequency adjustment will be rounded to the nearest DAC level. In doing this, the current bias may be used to determine the rounding of the adjustment. For example, if the clock bias is large and needs reducing then the DAC level may be rounded to drift clock frequency towards the master pseudolite clock frequency.

The drift at time $t_{oc}$, $b_{n1}$, is adjusted by the frequency change to define the clock drift term as $$a_{f1}^n = b_{n1} + \frac{\Delta f_{PSL}^{actual}(t_{oc})}{f_{system}(t_{oc})} \quad \text{[Equation 21]}$$

where 'actual' refers to the frequency change which is performed (relating to finite DAC adjustment) as opposed to the required frequency adjustment.

The user receiver 5 applies this clock term at the same time the pseudolite oscillator is adjusted, i.e. on a super frame boundary, in order to keep the user receiver and pseudolite in synchronisation.

The other two clock terms are given by $$a_{f0}^n = b_{n0} \quad \text{[Equation 22]}$$

$$a_{f2}^n = b_{n2} \quad \text{[Equation 23]}$$

with $t_{oc} = t + t_{sf} + x$

The bias and acceleration terms are unaffected by the rate change and are still determined using $a_{f0}^n = b_{n0}$ and $a_{f2}^n = b_{n2}$. Alternatively, the acceleration history term may be set to zero.

A higher weighting of the history in the clock terms provides a longer response of the filter in tracking a change in drift. This may result in reduced accuracy of the clock terms following a frequency adjustment. The accuracy following a frequency adjustment can be improved by modifying the history when the frequency is adjusted. The history may be modified to equal the expected value of the clock term after frequency adjustment.

The system is configured to change the frequency of the pseudolite clock, and the system is configured to calculate an adjustment term based on the frequency change. The system is configured to transmit a drift term (as part of the exponential correction filter) applicable for a time following the frequency change, said drift term using the adjustment term.

Following adjustment of the clock, the measurement of frequency at $t_{oc}$ may be ignored and the filter must immediately adapt to new value of drift by adjusting the drift history, $\beta_{n1}(t-\Delta t)$ in Equation 2. The drift history term is replaced by the clock drift term as specified in Equation 21, (where t in this case is $t_{oc}+\Delta t$), in the filter using:

$$B_{n1}^{adjusted}((t_{oc}+\Delta t) = a_{f1}^n \quad \text{[Equation 24]}$$

where 'adjusted' refers to changing the filter history from the current value. This adjustment term reduces the "overshooting" of the predicted timing offset time, due to the timing offset usually being partially based on a previous, history, term.

The adjustment to the filter history is made at time $t_{oc}$ which is when the clock adjustment is performed and is written as $B_{n1}((t_{oc}+\Delta t)-\Delta t)$ to indicate that it is the history part of the filter $((t-\Delta t))$ at a time of $\Delta t$ after the clock adjustment performed. The adjusted drift history is equal to the drift term that was determined and is being applied by the user receiver 5 at this time. Thus, the previous value of the compensated timing property (e.g. drift), calculated at a time prior to time t, is adjusted, which may be to the same value as the determined timing property (e.g. drift).

In summary, the positioning system comprises a transmitter configured to transmit one or more clock terms of a first clock. The clock terms includes a drift term specifying rate of change of a timing offset between said first clock and said reference time.

The drift term is calculated from a recently determined drift and a previous value of the drift term. Preferably, the drift term is calculated from a weighted sum of the measured drift and an estimator of the drift history formed from a number of previous measurements.

Following a change of frequency of the first clock, preferably controlled by the monitoring and control station 10, the system (slave pseudolite) configured to transmit a drift term calculated using an adjusted previous value of the drift term. Preferably, the drift term history component in Equation 2, i.e. $B_{n1}(t-\Delta t)$ is replaced by the term $B_{n1}^{adjusted}$ which includes an adjustment term providing the predicted drift following the rate change:

$$B_{n1}^{adjusted} = a_{f1}^n = b_{n1} + \frac{\Delta f_{PSL}^{actual}(t_{oc})}{f_{system}(t_{oc})} \quad \text{[Equation 25]}$$

where $b_{n1}$ is the predicted drift term at the super frame boundary at which the frequency change is scheduled to occur. The term $b_{n1}$ is calculated before the frequency change occurs.

Thus, the drift term for a time following the frequency change is calculated with a reduced or no dependence on a previous value (history) of the drift term. The history part is replaced by a modified term including the adjustment term, which is preferably the predicted change in drift following the rate change. The replacement term $B_{n1}^{adjusted}$ consists of the predicted drift at the time of frequency change plus the expected change in drift due to the actual frequency change.

In particular, the timing offset is calculated from one or more compensated timing properties, as described for the exponential correction filter. Compensated timing properties at a time t are calculated from a received determined timing property; i.e., the drift as measured by the monitoring and control station 10 from the pseudolite transmission. The monitoring and control station 10 also receives a previous value of the compensated timing property, calculated at a time prior to time t; which is termed the filter history, and is an older value of the timing property being calculated. The monitoring and control station 10 applies a first weighting factor to the determined timing property and applies a second weighting factor to the previous value of the compensated timing property. The first and second weighting factors are complementary, i.e. if the first weighting factor $\alpha$ is between 0 and 1, the second weighting factor is $(1-\alpha)$. The monitoring and control station 10 calculates the compensated timing property based on the weighted determined time property and weighted previous value of the compensated timing property, and the timing offset calculated using the one or more compensated timing properties. The system is configured to adjust a frequency of the first clock towards a frequency of the second clock. In particular, the monitoring and control station 10 transmits control signals to the relevant pseudolite transmitting the first transmission. The system is configured to, following the adjustment of the frequency of the clock controlling the first transmission, adjust the previous value of the compensated timing property (drift) used to calculate a subsequent compensated timing property. The filter history term is reset to be equal to the estimated timing property, and so the subsequent calculation by the exponential correction filter of timing drift will be based only on the current measured (determined) timing property.

The actual frequency adjustment will be predicted through calibration of the oscillator prior to the system being considered fully operational, but the true frequency adjustment will not be known until a number of measurements have been received and the clock terms can be determined again. For start-up this does not pose any problems but when operational, any differences in the true frequency change and the expected frequency change will manifest as timing errors which may grow until the clock terms can be updated again. Therefore accurate calibration of the oscillator control voltage is essential so a known adjustment of the DAC produces a known adjustment in frequency.

Adjustments to a slave pseudolite clock frequency can be made if the bias or drift relative to system time becomes too large. If the bias limit is triggered on determining the clock terms, then an appropriate clock adjustment will be calculated and the broadcast clock terms will be adapted accordingly. Preferably, the frequency change occurs at the end of a super frame, and the adjusted clock terms are valid for the subsequent super frame.

Prior to the frequency change of the slave pseudolite oscillator clock, the slave pseudolite transmits clock terms to the user receiver 5, said clock terms corresponding to the pseudolite oscillator clock after the frequency change. The user receiver 5 receives the clock terms over the super frame prior to the frequency change, and implements the new clock terms at the intended super frame boundary. The slave pseudolite oscillator clock frequency adjustment occurs at the same time as the new clock terms are implemented.

The time offsets calculated above may refer to a timing difference between the master pseudolite clock (reference time) and a slave pseudolite clock, and/or between an external reference time (e.g. from a satellite) and a slave pseudolite clock.

Chip Slipping

Figure 4A:
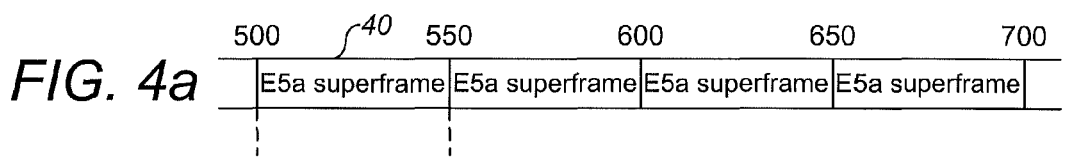
FIGS. 4a to 4c are a schematic view of the timing structures used by a pseudolite according to the present invention.

The absolute time of each slave pseudolite is preferably synchronised to the master pseudolite to within approximately 9 µs, in order to ensure pulsing alignment. The time 9 µs corresponds to 1/10 of the duration of a pulse transmission slot. Once adequate frequency alignment is achieved between the Slave and Master Pseudolite clocks, a time offset or bias is removed or reduced through a process termed 'chip slip' in accordance with the present invention. The PRN code modulates a data signal to provide code division multiple access (CDMA) modulation, as is known in the art. FIG. 4a shows a series of super frames 40, each having an equal length of 50 s. In the example shown, the first super frame 40 starts at a system time of 500 s, as determined by the master pseudolite. Each super frame 40 carries timing data indicating its starting time. The PRN codes forming a super frame comprise 10230 chips. The PRN code is preferably 1 ms in length, and so each chip has a length of approximately 98 ns.

PRN code chips are added or removed from the end of a navigation frame, and in particular at the end of a super frame, to delay or speed up the start of the subsequent frame, thus adjusting the pseudolite time. Once adequate alignment is achieved through chip slipping, the pseudolite can be used for operations. The 'chip slip' process allows relatively large adjustments of pseudolite time, and is generally only carried out during an initial synchronisation procedure. Frequency adjustments are generally used to control the bias during operation, so a further 'chip slip' is generally not necessary. In the event a 'chip slip' is required after initial synchronisation, the pseudolite may temporarily transmit an identification that the clock terms should not be used by the user receiver.

The timing bias is the difference between the reference time and the slave pseudolite time. The number of chips to be added or removed is equivalent to the length of the timing bias. The monitoring and control station 10 calculates the number of chips to be added or removed, and transmits the calculated number to a slave pseudolite 2. Thus, the positioning data transmission is transmitted from a first location, and the reference time is transmitted from a second location remote from the first location. The timing bias between the first transmission and the reference time is determined at a third location remote from the first location and second location, and the timing bias is transmitted from the third location to the first location.

The master pseudolite generates a reference time, which can be determined from a transmission itself formed using a repeating pseudorandom number (PRN) code, comprising a plurality of chips.

At start-up, following frequency synchronisation (frequency adjustment), the pulsing alignment of each slave pseudolite time is carried out by adding or removing chips from the end of a super frame to delay or speed up the start of the next super frame. In this way, the absolute time is adjusted by the number of chips which are added or slipped, and timing bias is reduced. Following chip addition or subtraction, it is likely that the user receiver 5 will lose lock on the pseudolite (due to altering of the PRN code) and hence it may be desirable to chip slip all pseudolites at the same time to speed up the time synchronisation process.

The number of code chips added or removed may correspond to a part of a PRN code. Alternatively, the code chips added or removed may correspond to at least one entire PRN code, and may correspond to a whole number of entire PRN codes and any fraction of a further PRN code.

As for the frequency synchronisation (frequency adjustment) process, the filter is used to determine the Pseudolite clock bias and drift (the drift at this stage will be small, because chip slipping follows frequency adjustment in the synchronisation procedure). The chip slip will be performed at the next but one super frame boundary (i.e. at $t_{oc}$) to keep all the algorithm processes similar and in step. Chip slipping must remove any time bias and so the required adjustment is equal and opposite to the current bias. For example, the required adjustment $\Delta T^{required}$ is given by $$\Delta T_n^{required} = -b_{n0} \quad \text{[Equation 26]}$$

Where $b_{n0} = B_{n0}(t) + B_{n1}(t) \times (t_{sf} + x) + B_{n2}(t) \times (t_{sf} + x)^2$ is the predicted timing offset as defined above.

Figure 4B:
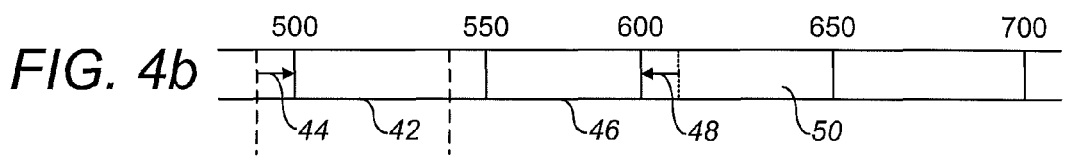

FIG. 4b shows super frame 42 having a positive bias 44. The super frame 42 is intended to start at a time of 500 s, and has been transmitted late by a slave pseudolite 2 relative to the system time set by the master pseudolite. In order to synchronise the super frames transmitted by the slave pseudolite 2 with the system time, the super frame 46 is reduced in length by removing chips from the end of the super frame 46. The removed chips have a length 48, which is a quantised equivalent to the positive bias 44. The subsequent super frame 50 directly follows the reduced super frame 46. Due to the reduction in length of super frame 50, the subsequent super frame 50 starts at approximately the correct time of 600 s. The super frame 50 contains data indicating commencement at approximately 600 s system time, with additional data indicating the exact time offset.

The length of a chip is approximately 98 ns, and the user receiver 5 preferably requires time information accurate to within 3 ns in order to calculate a position with an error within 1 m. It is therefore generally not possible to obtain an exact time adjustment through chip slipping alone, since only whole chips may be removed or added. A further synchronisation or data providing the known timing offset is also required. The required time adjustment should be modified to the quantised chip slipping amount by rounding to the nearest number of chips. Preferably, the number of chips is changed by chip removal.

Figure 4C:
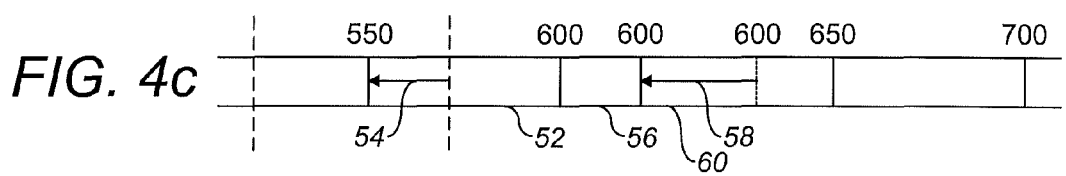

FIG. 4c shows a chip slipping embodiment the current bias is negative, meaning that chips should be added. The embodiment shown uses the preferred method of chip removal, followed by a modification to the timing data. This embodiment therefore avoids the need to add chips. In the embodiment of FIG. 4c, a super frame 56 is altered by a negative adjustment, by chip removal, by a number of chips 58. Removal of chips 58 synchronises the end of super frame 56 with the system time super frame ending at a time of 600 s. The subsequent super frame 60 is of standard length. Subsequent super frame 60 contains time data which is the same as in super frame 56, i.e. the time data indicates a start time of 600 s. The subsequent super frame 60 does not have timing data relating to an expected start time of a subsequent frame (i.e. 650 s). This modification of the expected time data ensures correspondence with the correct frame on system time. Thus, the super frame 60 following chip slip must have the same time tag as the shortened super frame 56.

If the bias, $b_{no}$ is negative, the required chip slip amount can be determined using $$\text{If } b_{n0} < 0, \Delta T_n^{required} = -(b_{n0} + 50) \quad \text{[Equation 27]}$$

If the current clock drift is negative then it would be desirable to make the bias positive and if the drift is positive, the bias should be negative. This maintains the clock within the control limits for longer and can be implemented when rounding to the nearest chip. As the chip slip is performed after frequency adjustment the drift should be very small, but the drift will generally not be zero and so the bias may be set in an opposite sense to the drift.

Following chip slipping, the clock bias is given by $$a_{f0}^n = b_{n0} + \Delta T_n^{actual} \quad \text{[Equation 28]}$$

where $\Delta T^{actual}$ is the actual time change performed through chip slipping. This should be the absolute time adjustment made relating to the number of chips adjusted. Note, $\Delta T^{actual}$ represents the actual time change and so will be positive for a negative $b_{n0}$ and vice versa. For example, this will be close to in magnitude and of opposite sign to the $b_{n0}$ value, hence reducing the bias close to zero.

The frequency of the clock is unchanged and so the other clock terms are unaffected $$a_{f1}^n = b_{n1} \quad \text{[Equation 29]}$$

$$a_{f2}^n = b_{n2} \quad \text{[Equation 30]}$$

and at the time of the chip slip, the bias filter is adjusted to $$B_{n0}^{adjusted}((t+x) - \Delta t) = a_{f0}^n \quad \text{[Equation 31]}$$

This adjustment of the bias filter is analogous to resetting the history in the exponential correction filter following a frequency adjustment, as described above. It is likely that the receiver 5 will lose lock following any chip adjustment and hence depending on the duration of 'black out' it may be not be necessary to adjust the filter terms, but instead to simply re-start the filter when measurements return. Clock terms do not have to be determined because default values are transmitted during this phase of operations, i.e. chip slipping should only ever be performed when a pseudolite is transmitting invalid flags and hence is not used for user positioning.

Any of the features described may be used in combination with any other feature from any embodiment. Any of the features may form the subject of an invention, independently of any other feature.

The invention claimed is:

1. A positioning system comprising a transmitter configured to transmit a transmission including positioning data, wherein the system is configured to substantially synchronise the transmission with a reference time, and wherein the transmission is formed using a repeating pseudorandom number (PRN) code comprising a plurality of chips, and the system is configured to determine a timing bias between the transmission and the reference time, wherein the system is configured to change the number of chips in said transmission such that the timing bias of a subsequent pseudorandom number (PRN) code is reduced.

2. The positioning system as claimed in claim 1 further comprising one or more pseudolites configured to transmit one or more transmissions and/or reference time.

3. The positioning system as claimed in claim 1 wherein the transmission comprises a plurality of super frames formed using the repeating pseudorandom number (PRN) code, and the change in the number of chips occurs at the end of a super frame such that the timing bias of a subsequent super frame is reduced.

4. The positioning system as claimed in claim 1 wherein if there is a positive timing bias between said transmission and the reference time, the number of chips in one or more pseudorandom number (PRN) code is reduced, or if there is a negative timing bias between said transmission and the reference time, the number of chips in one or more pseudorandom number (PRN) code is reduced and timing information in the said transmission is changed to align with the reference time.

5. The positioning system as claimed in claim 1 wherein said transmission is transmitted from a first location, and
the reference time is transmitted from a second location remote from the first location,
the timing bias between the first transmission and the reference time is determined at a third location remote from the first location and second location, and
the timing bias is transmitted from the third location to the first location.

6. The positioning system as claimed in claim 1 wherein the timing bias is calculated from one or more compensated timing properties, wherein the compensated timing properties at a time t are calculated by:
receiving a recently determined timing property of the first transmission relative to the reference time;
receiving a previous value of the compensated timing property of the first transmission relative to the reference time, calculated at a time prior to time t;
applying a first weighting factor to the determined timing property and applying a second weighting factor to the previous value of the compensated timing property,
calculating the compensated timing property based on the weighted determined time property and weighted previous value of the compensated timing property, the timing bias calculated using the one or more compensated timing properties.

7. The positioning system as claimed claim 6 wherein the determined timing properties are one or more of the timing bias, timing drift or timing acceleration, and/or the compensated timing property are one or more of a compensated timing bias, timing drift or timing acceleration.

8. The positioning system as claimed in claim 6 wherein a frequency of a clock controlling said transmission is adjusted towards a frequency of a clock controlling the reference time,
wherein the system is configured to, following the adjustment of the frequency of the clock controlling said transmission, use a modified previous value of the compensated timing property which includes the predicted frequency change.

9. The positioning system as claimed in claim 6 wherein the system is configured to determine said timing bias for a future time $t_{oc}$
wherein the timing bias at time $t_{oc}$ is calculated from one or more compensated timing properties, and
the system is configured to transmit the timing bias prior to future time $t_{oc}$.

10. A method of synchronising a transmission with a reference time in a positioning system, wherein the transmission is formed using a repeating pseudorandom number (PRN) code comprising a plurality of chips,
determining a timing bias between the transmission and the reference time,
changing the number of chips in the transmission such that the timing bias of a subsequent pseudorandom number (PRN) code is reduced.

11. A positioning system comprising a transmitter configured to transmit one or more clock terms of a first clock relative to a reference time,
wherein the clock terms include a drift term specifying rate of change of a timing bias between said first clock and said reference time;
wherein said drift term is calculated from a recently determined drift and a previous value of the drift term;
wherein the system is configured to transmit a modified drift term applicable for a time following a frequency change of the first clock, said modified drift term including an adjustment term based on the predicted frequency change.

12. A positioning system as claimed in claim 11 wherein the previous value of the drift term, in the modified drift term, is replaced by a predicted value of the drift term at the time of the frequency change and said adjustment term based on the predicted frequency change.

13. A positioning system comprising a transmitter configured to transmit a transmission comprising one or more clock terms of a first clock relative to a reference time,
wherein the clock terms include one or more timing properties defined between said first clock and said reference time;
wherein the system is configured to change the frequency of the first clock,
wherein the system is configured to calculate and transmit clock terms prior to the frequency change, said clock terms relating to a time after the frequency change.

14. A positioning system as claimed in claim 13 wherein the transmission comprises a plurality of super frames, wherein said timing properties are transmitted in one of said super frames, and said timing properties relate to a subsequent super frame.

15. A method of providing positioning data, comprising transmitting one or more clock terms of a first clock, said first clock substantially synchronised with a reference time,
wherein the clock terms include one or more timing properties defined between said first clock and said reference time;
changing the frequency of the first clock, calculating and transmitting clock terms prior to the frequency change, wherein said clock terms relate to a time after the frequency change.

* * * * *